United States Patent
Brooks

(10) Patent No.: US 7,849,039 B2
(45) Date of Patent: Dec. 7, 2010

(54) METHOD FOR USING ONE-DIMENSIONAL DYNAMICS IN ASSESSING THE SIMILARITY OF SETS OF DATA USING KINETIC ENERGY

(76) Inventor: Roger K. Brooks, 690 Wildwood La., Palo Alto, CA (US) 94303

(*) Notice: Subject to any disclaimer, the term of this patent is extended or adjusted under 35 U.S.C. 154(b) by 591 days.

(21) Appl. No.: 11/941,732

(22) Filed: Nov. 16, 2007

(65) Prior Publication Data
US 2008/0215566 A1    Sep. 4, 2008

Related U.S. Application Data

(60) Provisional application No. 60/883,001, filed on Dec. 31, 2006, provisional application No. 60/882,838, filed on Dec. 29, 2006.

(51) Int. Cl.
*G06F 17/00* (2006.01)
(52) U.S. Cl. ...................................................... 706/45
(58) Field of Classification Search ............. 706/45–46, 706/62; 707/692, 758, 749; 708/201
See application file for complete search history.

(56) References Cited

U.S. PATENT DOCUMENTS

| | | | | |
|---|---|---|---|---|
| 5,442,716 A | * | 8/1995 | Otsu et al. ................. 382/181 |
| 5,933,823 A | * | 8/1999 | Cullen et al. ........................ 1/1 |
| 5,956,404 A | * | 9/1999 | Schneier et al. .............. 713/180 |
| 6,096,961 A | * | 8/2000 | Bruti et al. ...................... 84/609 |
| 7,031,980 B2 | * | 4/2006 | Logan et al. ........................ 1/1 |
| 2008/0140741 A1 | * | 6/2008 | Brooks ......................... 708/201 |
| 2008/0162421 A1 | * | 7/2008 | Brooks ............................ 707/2 |
| 2008/0162422 A1 | * | 7/2008 | Brooks ............................ 707/2 |
| 2008/0215529 A1 | * | 9/2008 | Brooks ............................ 707/2 |
| 2008/0215530 A1 | * | 9/2008 | Brooks ............................ 707/2 |
| 2008/0215567 A1 | * | 9/2008 | Brooks ............................ 707/5 |

* cited by examiner

*Primary Examiner*—David R Vincent

(57) ABSTRACT

A method for finding sets of data (SDDs) for presentation in one-dimension, which are similar to a target SDD, is invented. The method leverages a new category of signatures, called equivalence signatures, to characterize the SDDs and is applicable to all types of data with special interpretation for data, such as text, binaries and audio, that may be presented in one-dimension. The equivalence signature is computed as the functional for the kinetic energy of a point particle whose path is specified by the values of the digital data. These signatures have the salient feature that, at worst, they change in a bounded manner when small changes are made to the SDDs and when used to find SDDs that are similar to a target SDDs, they allow for a significant reduction in the number of SDDs to be compared with the target. This is an improvement over the state of the art wherein the computational expensive process of performing a complete search against the entire corpus must be applied.

18 Claims, 4 Drawing Sheets

METHOD FOR USING ONE-DIMENSIONAL DYNAMICS IN ASSESSING THE SIMILARITY OF SETS OF DATA USING KINETIC ENERGY

CROSS-REFERENCE TO RELATED APPLICATIONS

This application claims the benefit of patent application Ser. No. 60/883,001, filed Dec. 31, 2006 by the present inventor and patent application Ser. No. 60/882,838, filed Dec. 29, 2006 by the present inventor.

FEDERALLY SPONSORED RESEARCH

Not Applicable

SEQUENCE LISTING OR PROGRAM

Not Applicable

BACKGROUND OF THE INVENTION

1. Field of the Invention

This invention relates to the identification and retrieval of digital data by a computing device.

2. Prior Art

A method for the discovery of a set of digital data (SDD), such as text, binaries, audio channels, and the like, that are organized for point-wise presentation in one-dimension, that are similar to a target SDD, is invented here. Formulae for the dynamics of the paths swept out by the data are used as signatures that characterize equivalence classes of SDDs with the same or numerically close data. The method leverages these "equivalence signatures" to find SDDs that are similar to target SDDs and, separately and alternatively, find SDDs that are dissimilar from the target SDDs.

The definition of "similarity", and thus the features and method used to compute it, is idiosyncratic to the retrieval application [O'Connor]. In the case of image retrieval [Gonzalez], methods using entropy, moments, etc. as signatures, have been invented [U.S. Pat. Nos. 5,933,823; 5,442,716]. Another invention [U.S. Pat. No. 7,246,314], uses closeness to a Gaussian model as a similarity measure for identifying similar videos.

The cost of implementing these methods is typically proportional to the product of the number of SDDs in the database with the cost of computing the distance between the target SDD and another SDD. The latter often [Raghavan] involves the computation of the projection angle between two vectors that represent the features (e.g., histogram of the text elements) of the SDDs. For large databases, this process can be both resource and time expensive. A two step method is required wherein, during the retrieval phase, definitely dissimilar SDDs are first weeded out thereby significantly reducing the number of candidates for similarity. This first step should be computationally inexpensive thus significantly reducing the resource requirements and latency in computing the results of the second step, the application of traditional features.

Intuitively, if two SDDs are similar, then they should be locally deformable into each other. For example, if two audio channels are rescalings of each other, then the audio channels are similar.

This invention leverages results from Classical Mechanics [Abraham] and the differential geometry of symmetric spaces [Helgason] to address this problem. In particular, we appeal to field theory representations for the functional for the motion of a point-particle in the space swept out by the SDD when stepping through the presentation space. By construction, these lengths are invariant under reparameterizations of the presentation space and thus characterize equivalence classes of length preserving maps between the presentation and data spaces.

We interpret each SDD as a sampling of maps from a one-dimensional space, N, with coordinate, ($\theta$) to an m-dimensional space, M, with coordinates $\sigma^A(\theta)$, for $A=1, \ldots m$ and seek length preserving equivalence classes of such maps. We label the length of the presentation space dimension as L.

Let the raw data, $\tilde{\sigma}^A(\theta)$, of each SDD be organized into m data planes, e.g., two PCM channels of stereo audio, for presentation and let each plane have a maximum and minimum value for the data in that plane, $\tilde{\sigma}_{max}^A$ and $\tilde{\sigma}_{min}^A$, respectively. The maximum and minimum values of each of the two planes are used to normalize their data to new minimum and maximum values, $\sigma_{max}^A$ and $\sigma_{min}^A$ respectively, through the expressions:

$$\sigma^A(\theta) = \left[\frac{\sigma_{max}^A - \sigma_{min}^A}{\tilde{\sigma}_{max}^A - \tilde{\sigma}_{min}^A}\right][\tilde{\sigma}^A(\theta) - \tilde{\sigma}_{max}^A] + \sigma_{max}^A \qquad \text{Eqn. 1}$$

Additional normalizations of the SDD, such as scaling to a fixed length and the like, may also be performed.

If objects have been segmented from the SDD then the data for these objects are themselves SDDs. We henceforth refer to each segmented portion as a "SDD section" with its own map, $\sigma$.

The equivalence signature is the functional for the motion of a point-particle in a space with metric $G_{AB}(\sigma)$: [Weinberg]:

$$\xi[\sigma] \equiv \int_0^L d\theta e^{-1} \sum_{A=1}^m G_{AB}(\sigma) \frac{d\sigma^A}{d\theta} \frac{d\sigma^B}{d\theta} \qquad \text{Eqn. 2}$$

where we are free to choose the $G_{AB}(\sigma)$ as any metric for the data space as well as the einbein, $e(\theta)$, on the presentation space. Once the choice of the metric is made, however, the chosen metric must be used in all computations of equivalence signatures that are to be compared to deduce the degree of similarity of their respective data. The choice of metric used in the primary embodiment of this invention is defined in terms a constant, K, and a constant m×m matrix $C_{AB}$ as $$G_{AB}(\sigma) \equiv C_{AB} + \frac{KC_{CA}\sigma^C C_{DB}\sigma^D}{1 - KC_{EF}\sigma^E \sigma^F} \qquad \text{Eqn. 3}$$

For simplicity we will later choose $C_{AB} = \delta_{AB}$ and consider the cases where K=0 as well as K=−1. We will also take $e(\theta)=1$ thus making the presentation space Euclidean.

Consider two SDD sections, $\sigma'^A(\theta)$ and $\sigma^A(\theta)$ such that at each point, the difference between the values of the maps is $\epsilon^A(\theta)$, $$\epsilon^A(\theta) = \sigma'^A(\theta) - \sigma^A(\theta) \qquad \text{Eqn. 4}$$

For the two SDD sections to be similar we take $\epsilon^A(\theta)$ to be small compared with $\sigma^A(\theta)$ so that terms of order $\epsilon^2(\theta)$ can be neglected. With this as a quantitative measure of similarity, we can assign bounds on the differences of the equivalence signatures via the functional difference:

$$\Delta\xi[\sigma;\epsilon] \equiv |\xi[\sigma+\epsilon] - \xi[\sigma]| \quad \text{Eqn. 5}$$

As $\epsilon^A(\theta)$ is small, to a first approximation, $\Delta\xi[\sigma;\epsilon]$ is a linear functional of $\epsilon^A$. We will exploit this henceforth. For example, suppose we are interested in finding audio channels the data values of whose amplitudes differ by no more than P percent at each sample, then $\epsilon^A(\theta) = p\sigma^A(\theta)$ are used in the computation of $\Delta\xi[\sigma;\epsilon]$ Retrieval of similarity candidates proceeds by finding those audio channels with values of $\xi[\sigma]$, denoted as $\xi[\sigma_{similar}]$, for which the following inequalities hold:

$$|\xi[\sigma_{target}] - \xi[\sigma_{similar}]| \leq \Delta\xi[\sigma_{target};\epsilon] \quad \text{Eqn. 6}$$

As an example for the reduction factor for the number of CPU cycles and other resources required in finding similar sections of SDDs in a corpus, assume for simplicity that the equivalences signatures of the SDD sections in the corpus are uniformly distributed in $[\xi_{max}, \xi_{min}]$. If for a target SDD section, the choice of similarity leads to $\Delta\xi[\sigma;\epsilon]$, the reduction in the number of secondary features to be compared is $$f_r = \frac{(2\Delta\xi[\sigma;\epsilon]+1)}{(\xi_{max}-\xi_{min}+1)} \quad \text{Eqn. 7}$$

In state of the art information retrieval methodologies, the feature vector which is used for each SDD section would have to be compared to all $N_c$ feature vectors computed for the SDD sections in the corpus. Upon employing the method invented here as a precursor to the feature vector comparison, the number of feature vectors to be compared would be reduced to $f_\xi N_c$.

SDD sections that have the same value for the equivalence signature will be related by A. rigid translations and rotations within the presentation space
B. reparameterizations of the presentation space,
C. reversing the signs of the data values,
D. rigid rotations of the $\sigma^A$ into each other about the origin
E. local translations in the data space of the form $$\epsilon^A(\sigma) = \epsilon^A\sqrt[t]{(1-KC_{CD}\sigma^C\sigma^D)} \quad \text{Eqn. 8}$$

separately and collectively. Proofs of the invariance of the functional in Eqn. 2 under these symmetries are recounted in works such as Ref. [Weinberg]. For certain types of data, a subset of these symmetries are required for similarity whereas the remaining symmetries account for the presences of non-similar data with the same values for the equivalence signatures; i.e., false positives. For example, for audio, we would like to include as part of the realization of similarity so as to account for different linear combinations of the audio channels.

OBJECTS AND ADVANTAGES

The objects of the current invention include the:
1. computation of an equivalence signature for each SDD section such that two SDD sections with equivalence signatures that differ by more than a prescribed amount, will not be similar,
2. population of a database with the equivalence signatures, secondary features and other meta data about the SDD,
3. use of the equivalence signatures for the identification of those SDDs that are not similar to a target SDD,
4. use of equivalence signatures for the identification of those candidate SDDs that may be similar to a target SDD,
5. use of the secondary features and other meta data for the candidate similar SDDs in further analysis, such as feature comparison, to determine the final set of similar SDDs, and
6. retrieval of the files containing the similar SDDs by means of the meta data stored in the database.

The advantages of the current invention include:
1. a method for computing these signatures for data, such as text, that have segmented components, such as sentences, realized in a one-dimensional plane with each point in the plane having a plurality of values,
2. a quantifiable means for measuring similarity,
3. a quantifiable means of determining false positives, and
4. the computational and resource expense of using feature comparison methods to determine the similarity of SDDs is reduced to a fraction given by a function of the change allowed between similar data.

SUMMARY

In accordance with the present invention, a method for determining the similarity of sets of data uses the metric induced by the values of the data to compute an equivalence signature for each segmented component or section of sets of digital data (SDDs), and further uses the differences of the equivalence signatures of any two sections of a SDD as the measure of the similarity distance between sections of said SDDs. The output from this method can be used to significantly reduce the computational expense, time and resources required by a subsequent secondary feature comparison.

DRAWINGS

Figures

In the drawings, closely related figures have the same numerically close numbers.

DETAILED DESCRIPTION

Preferred Embodiment—FIGS. 1-4

A preferred embodiment of the method of the present invention is illustrated in FIGS. 1-4.

A SDD is represented as a set of integers (realized in a computing device as a set number of bits). Each SDD may be realized as the addition of layers of or concatenation of SDD sections. The entire SDD, or the resultant from the point-wise addition of or concatenation of all sections of the SDD, is also taken to be a section. Each point in said sections may have a plurality of integer values. For example, some audio data are composed of audio objects segmented by silence boundaries with each sample having left and right stereo data values.

To determine the similarity, or separately and alternatively non-similarity, of one or a plurality of SDDs with a plurality of SDDs, each SDD may be numerically characterized. For example, each section of the SDDs of a corpus of SDDs may be assigned an equivalence signature that has the property that small changes to the section of the SDD, which maintain similarity with the original section of the SDD, will not significantly change the equivalence signature.

As specified by Eqn. 2, the equivalence signature for each section of a SDD is given by a functional computed over the data of the SDD's section interpreted as a mapping between the presentation data and the space of data values. Once an equivalence signature is assigned to a section of a SDD, then a plurality of SDDs that are small deformations of the former SDD will have equivalence signatures that are within a bounded range of the equivalence signature of the former SDD as given by Eqn. 5. That range is computed based on configurable similarity threshold parameters that specify the point-wise allowed differences between similar sections of SDDs. Consequently, SDD sections that are candidates for similarity with a section of a target SDD can be identified, in a database, by requiring that the absolute value of the difference between the values of their equivalence signatures and that of the target's section be no more than the maximum allowed difference computed in terms of the target's data and the similarity threshold parameters. If a target SDD has $N_s^{(T)}$ sections of which $N_s^{(T)}(X)$ are similar to the sections of another SDD, X, then the degree of similarity of X to the target SDD is $$\frac{N_s^{(T)}(X)}{N_s^{(T)}}.$$

The closer the degree of similarity to one, the more similar X is to the target SDD. SDDs in a database that are not similar to a target SDD will have a similarity degree of zero.

Operation

Preferred Embodiment—FIGS. 1-4

Figure 1:
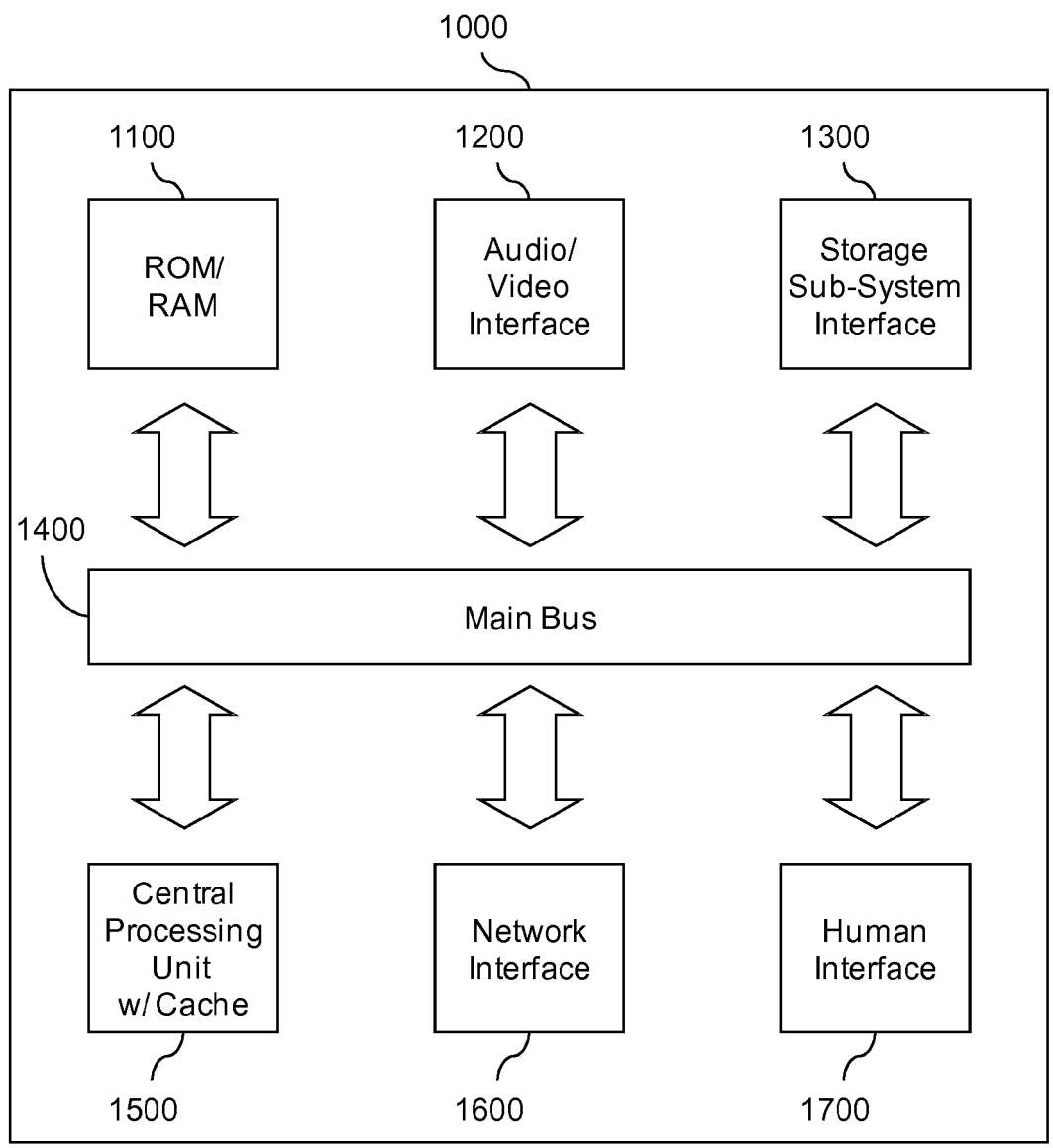
FIG. 1 is a block diagram of a computing device for calculating the equivalence signatures of a plurality of SDDs (targets) and finding previously analyzed SDDs that are similar to (or separately and alternatively not similar to) the target(s), according to one embodiment.

In FIG. 1, an illustration of a typical computing device 1000 is configured according to the preferred embodiment of the present invention. This diagram is just an example, which should not unduly limit the scope of the claims of this invention. Anyone skilled in the art could recognize many other variations, modifications, and alternatives. Computing device 1000 typically consists of a number of components including Main Memory 1100, zero or more external audio and/or video interfaces 1200, one or more interfaces 1300 to one or more storage devices, a bus 1400, a processing unit 1500, one or more network interfaces 1600, a human interface subsystem 1700 enabling a human operator to interact with the computing device, and the like.

The Main Memory 1100 typically consists of random access memory (RAM) embodied as integrated circuit chips and is used for temporarily storing the SDDs, configuration data, database records and intermediate and final results processed and produced by the instructions implementing the method invented here as well as the instructions implementing the method, the operating system and the functions of other components in the computing device 1000.

Zero or more external audio and/or video interfaces 1200 convert digital and/or analog A/V signals from external A/V sources into digital formats that can be reduced to PCM/YUV values and the like. Audio PCM values are SDDs.

Storage sub-system interface 1300 manages the exchange of data between the computing device 1000 and one or more internal and/or one or more external storage devices such as hard drives which function as tangible media for storage of the data processed by the instructions embodying the method of this invention as well as the computer program files containing those instructions, and the instructions of other computer programs directly or indirectly executed by the instructions, embodying the method of this invention.

The bus 1400 embodies a channel over which data is communicated between the components of the computing device 1000.

The processing unit 1500 is typically one or more chips such as a CPU or ASICs, that execute instructions including those instructions embodying the method of this invention.

The network interface 1600 typically consists of one or more wired or wireless hardware devices and software drivers such as NIC cards, 802.11x cards, Bluetooth interfaces and the like, for communication over a network to other computing devices.

The human interface subsystem 1700 typically consists of a graphical input device, a monitor and a keyboard allowing the user to select files that contain SDDs that are to be analyzed by the method.

Figure 2:
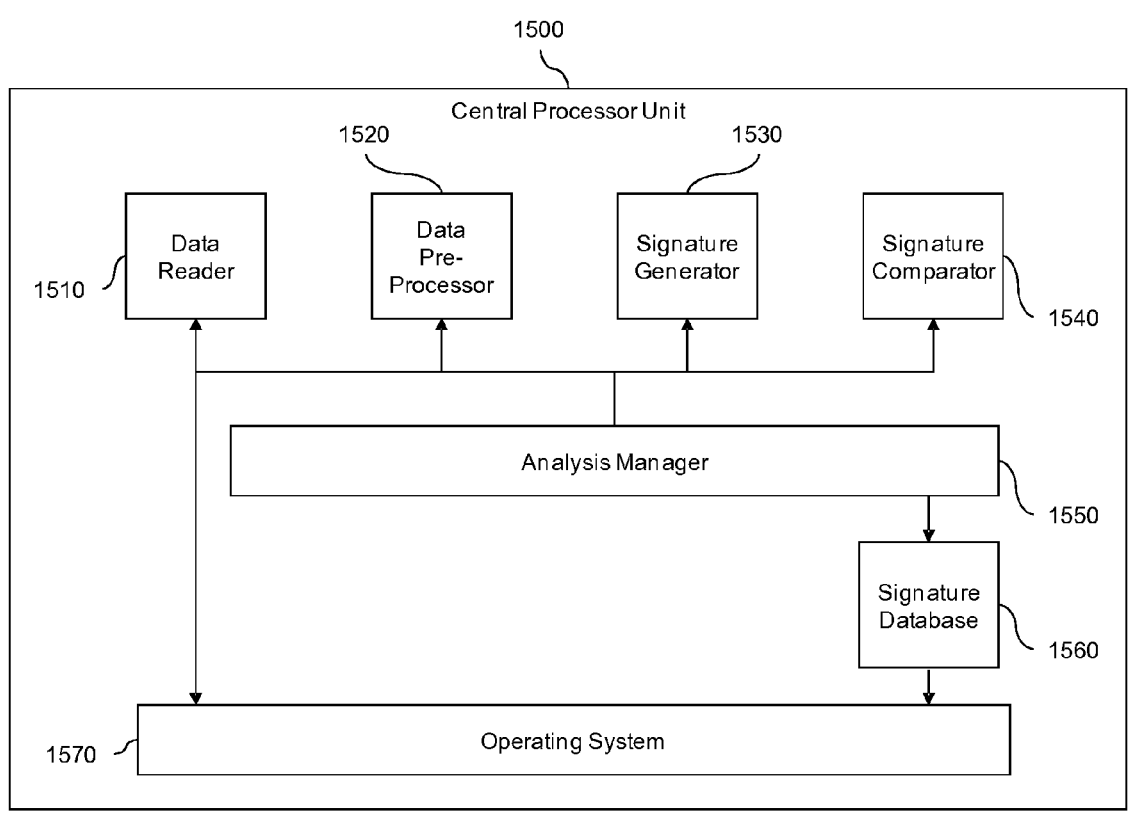
FIG. 2 is a block diagram of the modules and their interconnections, executed by the processing unit of the computing device in FIG. 1, in computing the equivalence signature of and determining the similarity of a plurality of SDDs to other SDDs, according to one embodiment.

In FIG. 2, an illustration is given of the modules executing the method of the present invention on the processing unit 1500.

An equivalence signature is computed as in, 1500, for a SDD under the control of the Analysis Manager. First, the Analysis Manager 1550 instructs the Data Reader 1510 to read the SDD and return control to the Analysis Manager 1550 upon completion. Secondly, when control is returned by the Data Reader 1510, the Analysis Manager 1550 instructs the Data Preprocessor 1520 to process the output from the Data Reader 1510 and return control to the Analysis Manager 1550 upon completion. Third, when control is returned by the Data Preprocessor 1520, the Analysis Manager 1550 instructs the Signature Generator 1530 to process the output from the Data Preprocessor 1520 and return control to the Analysis Manager 1550 upon completion. Fourth, when control is returned by the Signature Generator 1530, the Analysis Manager instructs the Signature Database 1560 to record the output from the Signature Generator 1530, said Signature Database may write the output to a file by means of calls to the Operating System 1570, and return control to the Analysis Manager 1550 upon completion. The Analysis Manager 1550 then waits for the next request.

The Data Reader module 1510 reads the SDD from its storage medium such as a file on a hard drive interfaced to the bus of the computing device or from a networked storage device or server using TCP/IP or UDP/IP based protocols, and the like.

The Data Preprocessor module 1520 finds the start and end of each section in the SDD by finding the start layer markers in the data stream of the SDD. It also reads the headers of each SDD to determine if the header matches with configured values specifying if the SDD is to be treated as a one-dimensional presentation space.

Figure 3:
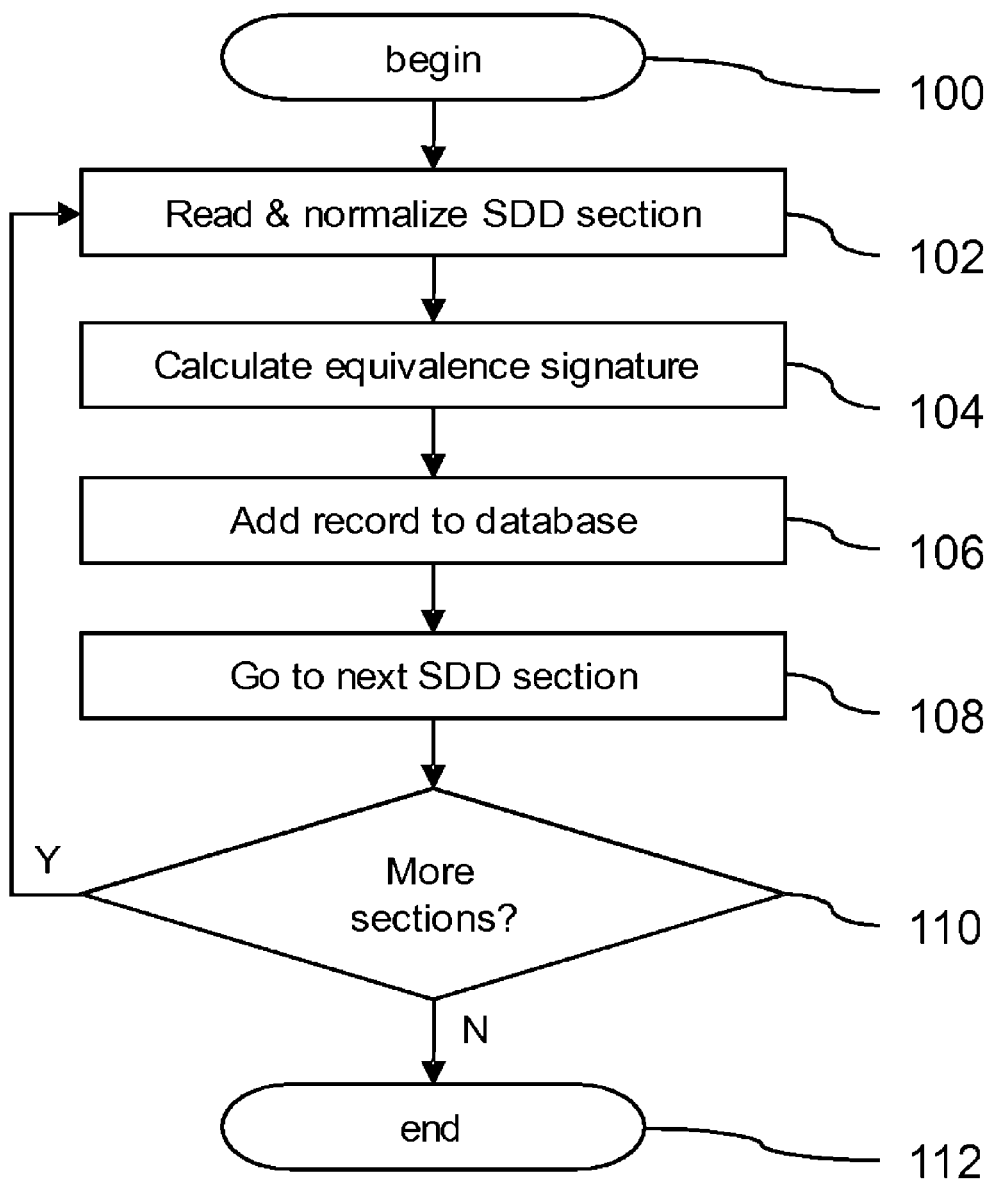
FIG. 3 is a flow diagram illustrating the steps taken by the modules, in FIG. 2, to compute equivalence signatures of SDDs and adding them to a database, according to one embodiment.

In FIG. 3, a request to compute the equivalence signatures of a SDD is received 100 by the Signature Generator 1530. The Signature Generator first reads the configured maximum and minimum values to which to normalize the data in subsequent steps. Secondly, it pre-processes 102 the first section 5 from the SDD by executing the following steps in sequence:

1) first, allocates a section buffer in main memory and partitions it into planes that are offset from each other by the product of the length of the data in each plane,
2) second, breaks each section into planes where each point of the data of the section is in one-to-one correspondence with the point in each plane,
3) third, for each plane, sets the maximum value and minimum value to the value of the data at the first point in the plane and then sequentially reads the value of the data at each subsequent point in the plane to see if that value is
   a) larger than the current maximum value for the plane, in which case it updates the current maximum value for the plane to the value of the data at the current point, or
   b) smaller than the current minimum value for the plane, in which case it updates the current minimum value for the plane to the value of the data at the current point,
4) fourth, for each plane, normalizes each data value read by
   a) subtracting the configured maximum value for the plane from said data value,
   b) multiplying the result from by the ratio of the differences between the configured maximum and minimum values for the plane and the difference between the maximum and minimum values computed for the plane in step, and
   c) adding the maximum value to form the normalized value,
   d) said normalized value is then written to the section buffer,
5) fifth, allocates an einbein buffer with length given by the length of the data in the section and fills it with the einbein read in from a configuration file or sets all of its values to one, by default,
6) sixth 104, if there are m planes in the section then the equivalence signature is calculated as follows:
   a) introduce and set a variable, with name such as ES, to zero,
   b) loop over the values of x from x=0 to x=(L−1) incrementing by one at each roll of the loop, where L is the length of the one-dimensional data,
   c) for each x, perform a loop over each of the m planes, label the latter loop as B
      i) read the data values at (X) and (x+1) from the B plane and assign it as the values of the variables with names such as $\sigma_x^B$, and $\sigma_{x+1}^B$ respectively,
      ii) compute $\sigma_{x+1}^B$ minus $\sigma_x^B$ and assign the result to a variable with name such as $d_x\sigma_x^B$,
   d) if K is set to zero, for each B,
      i) compute the product of $d_x\sigma_x^B$ and $d_x\sigma_x^B$, then divide the result of the product by the value of the einbein buffer at the x position, and add the result from the division to the value of ES,
      ii) continue to loop over B until the last plane is included at which point the value of ES is the value of the equivalence signature and computation skips to step below,
   e) if K is not zero, introduce variables with names such as Q and W,
   f) for each B, perform a second loop over the m planes, label the latter loop as A
   g) set w to zero and for each roll of the loop A,
      i) read the data value at (x) from the plane A and square it adding the result to W,
      ii) continue to loop over A until the last plane is included at which point the value of Q is set to the resultant of K divided by the resultant of one minus K times W.
   h) perform another A loop
      i) read the data values at (x) and (x+1) from the A plane and assign it as the values of the variables with names such as $\sigma_x^A$, and $\sigma_{x+1}^A$ respectively,
      ii) compute the difference of minus $\sigma_{x+1}^A$ and $\sigma_x^A$ assign the result to a variable with name such as $d_x\sigma_x^B$,
      iii) if the loop counter for A is equal to the loop counter for B, add one to the product of Q and the square of $\sigma_x^A$, then multiply the result of the addition with $d_x\sigma_x^A$ and $d_x\sigma_x^B$ to form a result that is then added to the value of ES
      iv) if the loop counter for A is not equal to the loop counter for, the product of Q, $\sigma_x^A$, $\sigma_x^B$, $d_x\sigma_x^A$ and $d_x\sigma_x^B$ to form a result that is then added to the value of ES
      v) continue to loop over A until the last plane is included at which point the next roll of the loop over A is performed,
   i) continue to loop over B until the last plane is included at which point the value of ES is the value of the equivalence signature,
7) seventh 106, a new record is added to the Signature Database 1560
   a) with the most significant half (MSH) of the key equal to the value the variable ES, and the least significant half (LSH) of the key set to one plus the value of the largest LSH of the other keys in the database which have a MSH equal to value of ES, and
   b) other fields containing the meta data about the section of the SDD that was provided in the request at 100; such meta data may include other signatures or features of the section of the SDD, and the like.

The calculations of 102-108 are performed while looping over the remaining sections. When no more sections remain 110, a new record is added to the Signature Database 1560 with fields containing the keys of the record of each section of the SDD, the meta data about the SDD including the path or URL to the file containing the SDD, the data and time that the SDD was last written, a text description of the data in the SDD, the name of the source or author for the SDD, the policy for the use of the SDD, other signatures or features of the SDD, and the like.

Figure 4:
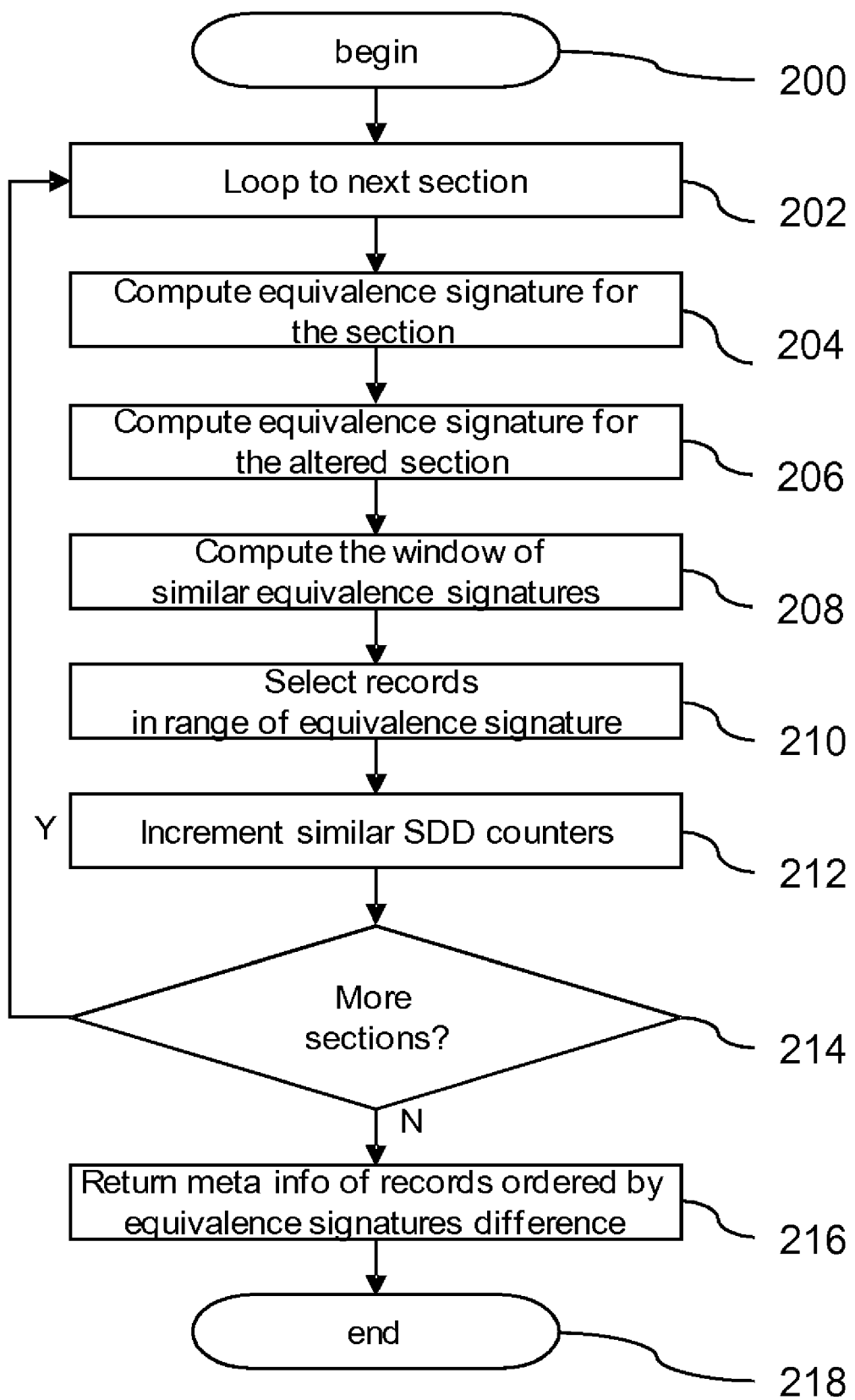
FIG. 4 is a flow diagram illustrating the steps taken by the modules, in FIG. 2, to find other SDDs that are similar to a target SDD, according to one embodiment.

In FIG. 4, a target SDD is provided in a request 200 to the Analysis Manager 1550 to find SDDs, that were previously analyzed and whose equivalence signatures are stored in records of the Signature Database 1560 that are candidates for similarity with the target. To with, the Analysis Manager 1550 instructs the Data Reader 1510, Data Preprocessor 1520 and Signature Generator 1530 in series as follows:

1) a dictionary, the dictionary of candidate similar SDDs, ordered as the doublet (key of a SDD meta data record, count of appearance of similar sections with said key of a SDD meta data record) is initiated with all counts set to zero,
2) the buffer of similarity difference data at each point in each plane is populated from configuration data containing said similarity difference data, 3) a loop over each section in the target SDD is performed 202
   a) the equivalence signatures for the section in the loop is computed 204 as described by FIG. 3, with each equivalence signatures so computed then stored as the value of the variable, ES,
   b) a second equivalence signature is computed 206 as described by FIG. 3 and then stored as the value of the variable, ESPrime, except that the value of the data at each point for each plane is replaced by the sum of
      (1) the value of the similarity difference data at the point in the plane
      (2) the value of the data at the point in the plane.
   c) the minimum equivalence signature for a similar section is computed 208 as the minimum of
      (1) ESPrime, and
      (2) twice the value of the variable ES minus the value of ESPrime,
      and the value of said minimum equivalence signature is assigned to the variable ESMin,
   d) the maximum equivalence signature for a similar section is computed 208 as the maximum of
      (1) ESPrime, and
      (2) twice the value of the variable ES minus the value of ESPrime,
      and the value of said maximum equivalence signature is assigned to the variable ESMax,
   e) a loop is performed over the signature records in the Signature Database 1560 for which the MSH of keys of the records is equal to or greater than the ESMin and less than or equal to ESMax, from each of the signature records found, the key for the meta data record of the SDD associated with the signature record is extracted and the count of the corresponding entry in the dictionary of candidate similar SDDs is incremented,
4) the keys of the SDD meta data records appearing in the dictionary of candidate similar SDDs are ordered by their appearance counts from highest count to lowest,
5) the meta data from each field in each record whose key is in the dictionary of candidate similar SDDs is returned, by the Analysis Manager 1550, ordered from most similar to less similar according to the ordering in step.

Operation

Additional Embodiments—FIG. 2

In a second embodiment, an equivalence signature is computed for a SDD as in 1500 through the pipelined steps: Data Reader 1510→Data Preprocessor 1520→Signature Generator 1530→Signature Database 1560 with the Data Reader 1510, Data Preprocessor 1520, Signature Generator 1530, and Signature Database 1560 performing the same function as in the preferred embodiment except that each module calls the succeeded module in the pipeline upon completion of their computation. In this second embodiment, the Analysis Manager is not invoked.

In a third embodiment, the similarity difference data is computed from the data of the target SDD by performing a digital signal processing transform, and the like, on said data. For similarity to hold, the difference between the pre-transformed and transformed data of the target SDD must be much small that the value of the data of the target SDD so that the square of said difference is quantitative negligible.

CONCLUSION, RAMIFICATIONS, AND SCOPE

Accordingly, the reader will see that the method invented here introduces novel features of an equivalence signature including that
1. it can be directly used to reduce by a factor, the set of candidate SDDs that are to be further analyzed for similarity by more computationally intensive feature comparison techniques such as [U.S. Pat. Nos. 7,031,980; 5,933,823; 5,442,716] and a similar reduction in the computing cycles and resources needed to find SDDs can be obtained;
2. the difference between the equivalence signatures of two non-equivalent SDDs is bounded;
3. false positive can be further restricted by breaking the symmetries of the equivalence signature;
4. it applies to multiple types of digital media.

The present invention has been described by a limited number of embodiments. However, anyone skilled in the art will recognize numerous modifications of the embodiments. It is the intention that the following claims include all modifications that fall within the spirit and scope of the present invention.

What is claimed is:

1. A computer method of reducing the number of dissimilar candidate sets of digital data (SDD) before retrieving one or more similar candidate SDDS comprising:
   a) receiving, into a memory by a processor, one or more SDD which can be presented in one-dimension, each SDD comprises:
      i) data values organized in sequential addresses or at set intervals of addresses,
      ii) the number of data values per data point,
      iii) a specified starting address, and
      iv) a specified number of data points, called the length;
   b) computing a numerical similarity signature, of the received one or more SDD, wherein the similarity signature is referred to as the equivalence signature, with a value related to the kinetic energy of a point particle whose path is specified by the values of the SDD,
   c) populating a database with the calculated equivalence signature,
   d) computing a similarity distance between the calculated equivalence signature of the received SDD and equivalence signatures of one or more SDD stored in a database as the absolute value of the difference of their equivalence signatures,
   e) discarding dissimilar candidate SDD where there is a high similarity distance, and
   f) retrieving one or more similar SDD from the database, and
   wherein, for text, binaries, audio data and/or other SDD that may be presented in one-dimension, the method for computing an equivalence signature as the kinetic energy of a point particle whose path is specified by the values of the normalized digital data, further comprises the following steps:
      a) looping over each x-position, from the first x-position to the second to last x-position, and for each position,
      b) performing a loop over each plane and then a second loop over each plane, inner to the first loop over each plane, c) for the plane of the outer loop over planes, computing the difference of the data value at said x-position in the plane and the data value at said x-position shifted by one in the x-direction in the plane,
d) for the plane of the inner loop over planes, computing the difference of the data value at said x-position in the plane and the data value at said x-position shifted by one in the x-direction in the plane,
e) evaluating the component, with indices specified by the counters of the two loops over the planes, of the metric on the space of data for the data values at said at said (x,y)-position,
f) forming the kinetic energy density at said x-position as the product of the result from step e with the result from step c and the result from step d,
g) adding the result for the kinetic energy density from the previous step to the result for the kinetic energy from the previous roll of this innermost loop; if this is the first roll of said innermost loop over each plane, then the result for the kinetic energy is set to the value of the kinetic energy density from step f, and
h) upon completion of said loop over the x-positions assigning the result for the kinetic energy as the value of the equivalence signature.

2. The method of claim 1, comprising a means for arranging the data values into planes with specified starting addresses and lengths of each presentation dimension for each plane wherein the $i^{th}$ plane consists of the set of the $i^{th}$ data values at each point.

3. The method of claim 1, wherein computing an equivalence signature of a section of digital data further comprises normalizing the data values of each plane by any of a plurality of methods including linearly mapping the data of each plane individually to fixed maximum and minimum values using slope-offset formulae and the like.

4. A method comprising:
a) receiving, into a memory by a processor, one or more sets of digital data (SDD) which can be presented in one-dimension, each set comprises:
  i) data values organized in sequential addresses or at set intervals of addresses,
  ii) the number of data values per data point,
  iii) a specified starting address, and
  iv) a specified number of data points, called the length;
a) computing a numerical similarity signature, of the received one or more SDD, wherein the similarity signature is referred to as the equivalence signature, with a value related to the kinetic energy of a point particle whose path is specified by the values of the SDD,
b) computing a similarity distance between the calculated equivalence signature of the received data and equivalence signatures of one or more SDD stored in a database as the absolute value of the difference of their equivalence signatures,
c) discarding dissimilar candidate SDD where there is a high similarity distance,
d) storing a record for each of the sections of said input set of digital data in a database, if said record is not already present in the database; and
e) querying the database for sections of the sets of digital data that are candidates for similarity with said one or more target sections of the said input set of digital data, and
wherein, for text, binaries, audio data and/or other SDD that may be presented in one-dimension, the method of computing an equivalence signature as the kinetic energy of a point particle whose path is specified by the values of the normalized digital data, further comprises the steps:
a) looping over each x-position, from the first x-position to the second to last x-position, and for each position,
b) performing a loop over each plane and then a second loop over each plane, inner to the first loop over each plane,
c) for the plane of the outer loop over planes, computing the difference of the data value at said x-position in the plane and the data value at said x-position shifted by one in the x-direction in the plane,
d) for the plane of the inner loop over planes, computing the difference of the data value at said x-position in the plane and the data value at said x-position shifted by one in the x-direction in the plane,
e) evaluating the component, with indices specified by the counters of the two loops over the planes, of the metric on the space of data for the data values at said at said (x,y)-position,
f) forming the kinetic energy density at said x-position as the product of the result from step (e) with the result from the step (c) and the result from step (d),
g) adding the result for the kinetic energy density from the previous step to the result for the kinetic energy from the previous roll of this innermost loop; if this is the first roll of said innermost loop over each plane, then the result for the kinetic energy is set to the value of the kinetic energy density from step (f), and
h) upon completion of said loop over the x-positions assigning the result for the kinetic energy as the value of the equivalence signature.

5. The method of claim 4, further comprises creating and writing a record, in said database, for each section in each set of the said input sets of digital data, the record comprises,
a) a key,
  i) the most significant half of whose value, is the equivalence signature of said section in the set of digital data, and
  ii) the least significant half of whose value is the sequential count, starting at zero, of sections of digital data with said equivalence signature and whose equivalence signatures were previously written to the database,
b) one or more fields including a field storing the value referencing the medium wherein said set of digital data is stored,
c) one or more fields including secondary feature data, for said planes or set of digital data, and
d) other fields containing meta data about said set of digital data.

6. The method of claim 4, wherein a storage identifier comprises the location of a file containing a set of digital data along with the starting position of said data set in the file and the length of the data comprising said set.

7. The method of claim 4, further comprises writing a record including assigning the key, the most significant half of whose value is the equivalence signature for a section in the set of digital data.

8. The method of claim 4, further comprises reading a plurality of records and for each of the records extracting the equivalence signature of a set of digital data as the most significant half of the key of the record and extracting the fields, containing secondary features as well as the meta data, including the storage identifier, from the record.

9. The method of claim 4, further comprises retrieving, from said database, a plurality of records for which the most significant half of the values of the keys of the records are equal to a specified equivalence signature of a said target sections.

10. The method of claim 4, further comprises retrieving from said database a plurality of records with the most significant half of the values of the keys being within a range of equivalence signatures.

11. The method of claim 4, further comprises selecting of a target section of said input set of digital data and computing of a lower and upper bound on the values of the equivalence signature such that any section of sets of digital data with equivalence signatures that are less than the lower bound or greater than the upper bound will not be similar to the target section and all other sections of sets of digital data recorded in the database will be candidates for sections of sets of digital data that are similar to the target section, with
 a) the lower bound given by the equivalence signature of the target section minus the absolute value of an equivalence signature delta for the target section, and
 b) the upper bound given by the equivalence signature of the target section plus the absolute value of an equivalence signature delta for the target section.

12. The method of claim 11, further comprises extracting, from said database, a plurality of records with keys such that the most significant half of each key is equal to or greater than said lower bound and equal to or less than said upper bound.

13. The method of claim 11, wherein said equivalence signature delta is computed as the equivalence signature of said target section of a set of digital data minus a second equivalence signature for said target section with data values transformed by configurable functions for each plane specifying the maximum changes to the data values at each data point in a plane in order for the plane so altered to still be considered similar to the corresponding unaltered plane.

14. The method of claim 13, further comprises reading the configurable functions for each plane specifying the transformation of the data values at each data point in each plane in order for the section so altered to still be considered similar to the corresponding unaltered section.

15. The method of claim 4, further comprises returning to a user of the method,
 a) the difference between the value of an equivalence signature of said target section and the most significant halves of the keys returned by said database; and
 b) the meta data from each field in the records identified by said keys.

16. The method of claim 4, further comprises calculating of and sorting of a list of differences, between the equivalence signature of said target pair of and the values of the most significant halves of the keys of the records of the candidates for similar digital data, from smallest to largest values of said differences along with a means for returning to the user of the method, the meta data from the records ordered by the sorted differences.

17. A method of comparing one or more sets of secondary features of received sets of digital data against secondary features of digital data whose records are in a database, comprising:
 a) receiving, into a memory by a processor, one or more sets of digital data which can be presented in one-dimension, each set comprising:
  i) data values organized in sequential addresses or at set intervals of addresses,
  ii) the number of data values per data point,
  iii) a specified starting address, and
  iv) a specified number of data points, called the length;
 b) computing a numerical similarity signature, referred to as the equivalence signature, for a set of received digital data, by using a value given by the kinetic energy of a point particle whose path is specified by the values of the digital data,
 c) computing a similarity distance between two sets of digital data as the absolute value of the difference of their equivalence signatures,
 d) storing a record for each of the sections of said input set of digital data in a database, if said record is not already present in the database,
 e) querying the database for sections of the sets of digital data that are candidates for similarity with said one or more target sections of the said input set of digital data; and
 f) comparing a set of secondary features provided with a target section of a set of digital data against the secondary features for similar sections of digital data whose records are in said database, and
 wherein the method further comprises selecting of a target section of said input set of digital data and computing of a lower and upper bound on the values of the equivalence signature such that any section of sets of digital data with equivalence signatures that are less than the lower bound or greater than the upper bound will not be similar to the target section and all other sections of sets of digital data recorded in the database will be candidates for sections of sets of digital data that are similar to the target section, with
  a) the lower bound given by the equivalence signature of the target section minus the absolute value of an equivalence signature delta for the target section, and
  b) the upper bound given by the equivalence signature of the target section plus the absolute value of an equivalence signature delta for the target section.

18. The method of claim 17, further comprising the comparison, of said set of secondary features provided with said target section, against the secondary features for said similar sections of sets of digital data found by querying the database and returning the list produced by the comparison of the secondary features as the final list of sections of sets of digital data that are similar to said target section.

* * * * *